(12) United States Patent
Chaterji et al.

(10) Patent No.: US 12,743,791 B2
(45) Date of Patent: Sep. 22, 2026

(54) SYSTEMS AND METHODS FOR MULTI-BRANCH VIDEO OBJECT DETECTION FRAMEWORK

(71) Applicants: PURDUE RESEARCH FOUNDATION, West Lafayette, IN (US); Wisconsin Alumni Research Foundation, Madison, WI (US)

(72) Inventors: Somali Chaterji, West Lafayette, IN (US); Saurabh Bagchi, West Lafayette, IN (US); Ran Xu, West Lafayette, IN (US); Yin Li, Madison, WI (US)

(73) Assignees: PURDUE RESEARCH FOUNDATION, West Lafayette, IN (US); Wisconsin Alumni Research Foundation, Madison, WI (US)

( * ) Notice: Subject to any disclaimer, the term of this patent is extended or adjusted under 35 U.S.C. 154(b) by 397 days.

(21) Appl. No.: 18/334,190

(22) Filed: Jun. 13, 2023

(65) Prior Publication Data

US 2023/0401726 A1 Dec. 14, 2023

Related U.S. Application Data

(60) Provisional application No. 63/351,674, filed on Jun. 13, 2022.

(51) Int. Cl.
*G06T 7/246* (2017.01)
*G06V 10/77* (2022.01)
(Continued)

(52) U.S. Cl.
CPC .......... *G06T 7/248* (2017.01); *G06V 10/7715* (2022.01); *G06V 10/82* (2022.01); *G06V 20/46* (2022.01)

(58) Field of Classification Search
CPC .......... G06T 7/248; G06T 7/246; G06T 7/73; G06T 2207/20008; G06T 2207/20084;
(Continued)

(56) References Cited

U.S. PATENT DOCUMENTS

2021/0350570 A1* 11/2021 Hibi ...................... G06V 20/64
2022/0327826 A1 10/2022 Chaterji et al.
(Continued)

OTHER PUBLICATIONS

Bagchi (2022) LiteReconfig at Eurosys 2022: Cost and Content-Aware Video Object Detection for Mobile GPUs, Social Post. https://x.com/bagchi_saurabh/status/1515703606862921732?s=20 [x.com].

(Continued)

*Primary Examiner* — Jianxun Yang
(74) *Attorney, Agent, or Firm* — Quarles & Brady, LLP

(57) ABSTRACT

Methods and systems for object detection are disclosed. The methods and systems include: receiving a video frame, determining an execution configuration among multiple configurations at an inference time based on the video frame and multiple metrics (e.g., a latency metric, an accuracy metric, and an energy metric), and performing object detection or object tracking at the inference time based on the video frame and the execution configuration. Other aspects, embodiments, and features are also claimed and described.

20 Claims, 10 Drawing Sheets

(51) Int. Cl.
*G06V 10/82* (2022.01)
*G06V 20/40* (2022.01)

(58) Field of Classification Search
CPC .. G06V 10/764; G06V 10/7715; G06V 10/82; G06V 20/46
See application file for complete search history.

(56) References Cited

U.S. PATENT DOCUMENTS

2023/0111375 A1* 4/2023 Clemons .................. G06N 3/08 706/15
2023/0290145 A1 9/2023 Chaterji et al.

OTHER PUBLICATIONS

Chen et al., (2020) "Memory Enhanced Global-Local Aggregation for Video Object Detection," https://openaccess.thecvf.com/content_CVPR_2020/papers/Chen_Memory_Enhanced_Global-Local_Aggregation_for_Video_Object_Detection_CVPR_2020_paper.pdf [openaccess.thecvf.com].
Chin et al., (2019) "ADAScale: Towards Real-Time Video Object Dectection Using Adaptive Scaling," arXiv:1902.02910v1 [cs.CV] Feb. 8, 2019.
Habibian et al., "Skip-Convolutions for Efficient Video Processing," https://openaccess.thecvf.com/content/CVPR2021/papers/Habibian_Skip-Convolutions_for_Efficient_Video_Processing_CVPR_2021_paper.pdf [openaccess.thecvf.com].
Lee et al., (2021) "Benchmarking Video Object Detection Systems on Embedded Devices under Resource Contention," In 5th International Workshop on Embedded and Mobile Deep Learning (EMDL'21) Jun. 25, 2021, Virtual, WI, USA. ACM, New York, NY, USA, 6 pages. https://doi.org/10.1145/3469116.3470010.
Liu et al., (2016) "SSD: Single Shot MultiBox Detector," https://link.springer.com/chapter/10.1007/978-3-319-46448-0_2 [link.springer.com].
Purdue College of Engineering, (2022) "Taming the wild: Streaming—and streamlining—analytics from the Internet of Things," Medium. https://medium.com/purdue-engineering/taming-the-wild-streaming-and-streamlining-analytics-from-the-internet-of-things-fd727833b604 [medium.com].
Redmon et al., (2018) "YOLOv3: An Incremental Improvement," arXiv:1804.02767v1 [cs.CV] Apr. 8, 2018.
Ren et al., (2015) "Faster R-CNN: Towards Real-Time Object Detection with Region Proposal Networks," https://papers.nips.cc/paper_files/paper/2015/hash/14bfa6bb14875e45bba028a21ed38046-Abstract.html [papers.nips.cc].
Sabater et al., (2020) "Robust and efficient post-processing for video object detection," arXiv:2009.11050v1 [cs.CV] Sep. 23, 2020.
Tan et al., (2020) "EfficientDet: Scalable and Efficient Object Detection," https://openaccess.thecvf.com/content_CVPR_2020/papers/Tan_EfficientDet_Scalable_and_Efficient_Object_Detection_CVPR_2020_paper.pdf [openaccess.thecvf.com].
Wu et al., (2019) "Sequence Level Semantics Aggregation for Video Object Detection," https://openaccess.thecvf.com/content_ICCV_2019/papersWu_Sequence_Level_Semantics_Aggregation_for_Video_Object_Detection_ICCV_2019_paper.pdf [openaccess.thecvf.com].
Xu et al., (2020) "ApproxDet: Content and Contention-Aware Approximate Object Detection for Mobiles," In The 18th ACM Conference on Embedded Networked Sensor Systems (SenSys '20), Nov. 16-19, 2020, Virtual Event, Japan. ACM, New York, NY, USA, 14 pages. https://doi.org/10.1145/3384419.3431159.
Xu et al., (2022) "LiteReconfig: Cost and Content Aware Reconfiguration of Video Object Detection Systems for Mobile GPUs," In Seventeenth European Conference on Computer Systems (EuroSys '22), Rennes, France. ACM, New York, NY, USA, 18 pages. Https://doi.org/10.1145/3492321.3519577.
Xu et al., ApproxDet: Content and Contention-Aware Approximate Object Detection for Mobiles, (2020) demo. https://.youtube.com/watch?v=2OQjeB8H6vg [youtube.com], 7 pages.
Xu et al., ApproxDet: Content and Contention-Aware Approximate Object Detection for Mobiles, ApproxDet SenSys (2020) Main Presentation: https://.youtube.com/watch?v=nMIPStUkTp4 [youtube.com], 39 pages.
Xu et al., ApproxDet: Content and Contention-Aware Approximate Object Detection for Mobiles, (2020) Video Ads https://youtube.com/watch?v=8i749DG2wqQ [youtube.com, 5pages.

* cited by examiner

SYSTEMS AND METHODS FOR MULTI-BRANCH VIDEO OBJECT DETECTION FRAMEWORK

CROSS-REFERENCE TO RELATED APPLICATION(S)

This application claims the benefit of U.S. Provisional Application No. 63/351,674 filed Jun. 13, 2022, the entirety of which is herein incorporated by reference.

STATEMENT OF GOVERNMENT SUPPORT

This invention was made with government support under Agency Grant Nos. CNS-2038986 and CNS-2146449 awarded by the National Science Foundation and under Agency Grant No. W911NF-2020-221 under the Army Research Lab. The government has certain rights in the invention.

TECHNICAL FIELD

This disclosure relates to computer vision and, in particular, to object detection and tracking.

BACKGROUND

Computer vision technology and other image or video processing technologies use object detection and objection tracking. Object detection is a computer vision technique to identify objects in videos or images. Object tracking is a computer vision technique to track movement of objects in videos or images. Various techniques and algorithms have been devised to perform object detection and tracking, including machine learning-based object detectors.

SUMMARY

Despite their impressive accuracy results on standard benchmarks, object detection and object tracking techniques, particularly those using machine learning models, come at a price of their complexity and computational cost. These costs impose a barrier to deploying these models under resource-constrained settings with strict latency and/or power requirements, such as real-time detection in streaming videos on mobile or embedded devices. As the demand for object detection and tracking for images or videos on mobile devices continues to increase, research and development continue to advance objection detection and tracking technologies to meet the growing demand for improved object detection with lower latency and energy consumption in objection detection.

In one example, a method, a system, and/or an apparatus for autonomous robot motion planning is disclosed. The method, the system, and/or the apparatus includes: receiving a video frame, determining an execution configuration among multiple configurations at an inference time based on the video frame and a plurality of metrics, and performing a computer vision analysis task at the inference time based on the video frame and the execution configuration. The multiple metrics include: a latency metric, an accuracy metric, and an energy metric.

This section presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

DETAILED DESCRIPTION

The detailed description set forth below in connection with the appended drawings is intended as a description of various configurations and is not intended to represent the only configurations in which the subject matter described herein may be practiced. The detailed description includes specific details to provide a thorough understanding of various embodiments of the present disclosure. However, it will be apparent to those skilled in the art that the various features, concepts and embodiments described herein may be implemented and practiced without these specific details. In some instances, well-known structures and components are shown in block diagram form to avoid obscuring such concepts.

Figure 1:
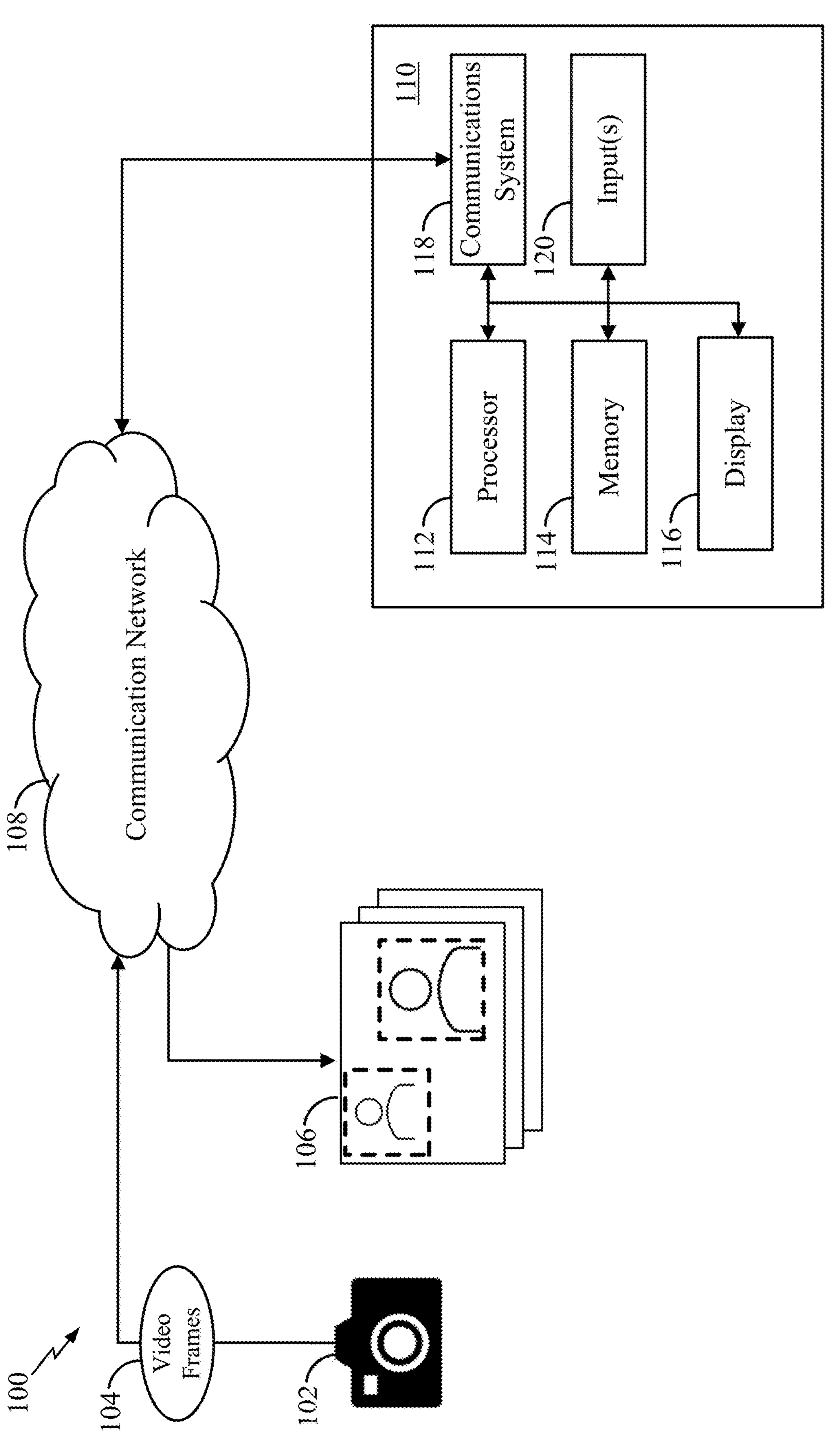
FIG. 1 is a block diagram conceptually illustrating a system for object detection according to some embodiments.

FIG. 1 shows a block diagram illustrating a system 100 for object detection according to some embodiments. The system 100 includes a video source 102, a detection result 106, a communication network 108, and a computing device 110. The video source 102 may be, for example, a camera (e.g., digital camera, webcam, etc.) configured to output video data including video frames 104. The detection result 106 may be, for example, an indication (e.g., a text, a symbol, a number, a box, a circle, an oval, a polygon, or any suitable shape) of a detected object in the video frames 103. The video source 102 and/or the detection result 106 can be transmitted via the communication network 108. The computing device 110 may be, for example, a smart phone, tablet, or other mobile computing device (e.g., powered by a battery or similar portable power source). Although FIG. 1 illustrates the video source 102 as being connected to the computing device 110 via the communication network 108, in some examples, the video source 102 is integrated with the computing device 110 (e.g., in the form of a smart phone or tablet camera) or directly coupled to the computing device 110 (e.g., a webcam coupled via wired connection directly to the computing device). In some examples, the computing device 110 can receive a video frame, determine an execution configuration at an inference time based on the video frame and multiple metrics, and perform object detection or object tracking at the inference time based on the video frame and the execution configuration.

As illustrated, the computing device 110 includes an electronic processor 112. The electronic processor 112 can be any suitable hardware processor or combination of processors, such as a central processing unit (CPU), a graphics processing unit (GPU), an application specific integrated circuit (ASIC), a field-programmable gate array (FPGA), a digital signal processor (DSP), a microcontroller (MCU), etc.

The computing device 110 can further include a memory 114. The memory 114 can include any suitable storage device or devices that can be used to store suitable data (e.g., video data including a video frame 10413 from the video source 102, object detection result, neural network model(s), etc.) and instructions that can be used, for example, by the electronic processor 112 to determine an execution configuration among multiple configurations at an inference time based on the video frame and multiple metrics, perform a computer vision analysis task at the inference time based on the video frame and the execution configuration, perform object tracking based on the second frame and based in part on the object detection for the first frame, extract multiple feature representations from the video frame, predict multiple accuracy indications corresponding to the multiple configurations based on the multiple feature representations, determine the execution configuration based on the multiple accuracy indications, the latency metric, and the energy metric, provide multiple feature representations for each of the multiple configurations to a first machine learning model, obtain the multiple accuracy indications corresponding to the multiple configurations from the first machine learning model, embed the latency metric and the energy metric on separate feature vectors using multi-layer perceptrons, and perform the object detection for the first video frame in the group of frames based on an object detection machine learning model. The memory 114 can include any suitable volatile memory, non-volatile memory, storage, or any suitable combination thereof. For example, the memory 114 can include random access memory (RAM), read-only memory (ROM), electronically-erasable programmable read-only memory (EEPROM), one or more flash drives, one or more hard disks, one or more solid state drives, one or more optical drives, etc. In some embodiments, the electronic processor 112 can retrieve instructions from the memory 114 and execute those instructions to implement a process 300, or a portion thereof, described below in connection with FIG. 3.

The computing device 110 can further include a communications system 118. Communications system 118 can include any suitable hardware, firmware, and/or software for communicating information over the communication network 108 and/or any other suitable communication networks. For example, the communications system 118 can include one or more transceivers, one or more communication chips and/or chip sets, etc. In a more particular example, the communications system 118 can include hardware, firmware and/or software that can be used to establish a Wi-Fi connection, a Bluetooth connection, a cellular connection, an Ethernet connection, etc.

The computing device 110 can receive or transmit information (e.g., video data including the video frame 102, object detection result, neural network model(s), etc.) and/or any other suitable system over the communication network 108. In some examples, the communication network 108 can be any suitable communication network or combination of communication networks. For example, the communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, the communication network 108 can be a local area network, a wide area network, a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc.

The computing device 110 can further include a display 116 and/or one or more inputs 120. In some embodiments, the display 116 can include any suitable display devices, such as a computer monitor, a touchscreen, a television, an infotainment screen, etc. to display the report or the detection result 106 with or without the video frames 104. The input(s) 120 can include any suitable input devices (e.g., a keyboard, a mouse, a touchscreen, a microphone, etc.) to provide input to the computing device 110.

Figure 2:
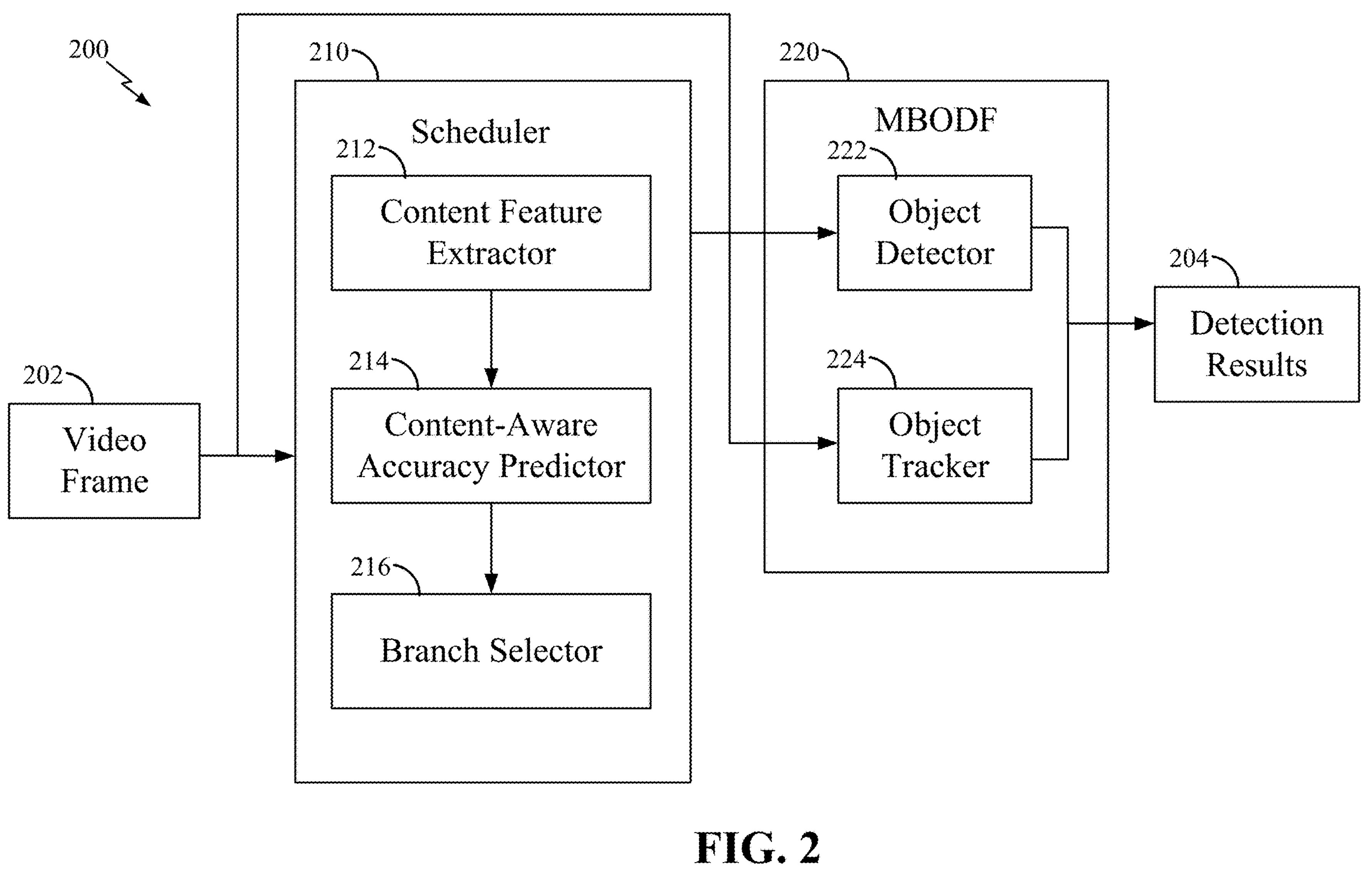
FIG. 2 illustrates an example system framework for object detection according to some embodiments.

FIG. 2 is an example system framework 200 for object detection. The framework 200 can include a scheduler 210 and a multi-branch object detection framework (MBODF) 220. In some examples, the scheduler 210 and the MBODF 220 can be implemented by the computing device 110 in FIG. 1. In other examples, at least one of the scheduler 210 or the MOBDOF 220 can be implemented in a remote device communicatively connected to the computing device 110 via the communication network 108. In some examples, the scheduler 210 of the framework 200 receives a video frame 202. The scheduler 120 can determine an execution configuration for the MBODF 220 among multiple configurations at an inference time based on the video frame 202 and multiple metrics (e.g., a latency metric, an accuracy metric, and an energy metric). In some examples, an execution configuration can include or be defined by a unique set of values or hyperparameters (also referred to as "tunable knobs" or "knobs") used by the MBODF 220 to configure the object detection and/or object tracking algorithm implemented by the MBODF 220 to analyze the video frame 202 and/or subsequent video frame(s) that follow the video frame 202. As described herein, the scheduler may determine and select the execution configuration for use by the MBODF 220 so that the MBODF can finish a particular vision task (e.g., object detection or tracking) within a distinct and fixed execution time (latency), with low energy consumption (e.g., below a threshold power level), and/or with a consistent accuracy across a dataset or video (e.g., within a range of accuracy limits or above a minimum accuracy threshold). As described herein, a configuration, a branch, execution branch, and an execution configuration of the MBODF are used interchangeably. The MBODF 220 of the framework 200 can perform object detection or object tracking at the inference time based on the video frame and the execution configuration. In some examples, the inference time can be defined as a time period from when a current frame (e.g., frame 202) is received by the framework 200 to when a subsequent frame is received by the framework 200. In some examples, during the inference time, the computing device 110 processes a query or a vision task for the video frame 202 (e.g., how many people are in the video frame) and provides an answer to the query (e.g., five people). Since the execution configuration is selected at inference time from a large set of fine-grained configurations based on the input content of the video frame 202, the detection accuracy and latency can be tailored to a particular scenario and significantly improved with a low computational overhead.

FIG. 2 shows an example workflow of the framework 200 where the scheduler 210 takes the video frame 202 as an input and determines the execution branch for the MBODF 220 to execute. The scheduler 210 is configured to select an execution branch from multiple available execution branches. In some examples, the scheduler 210 selects the execution branch that is the optimal execution branch given certain criteria. In some examples, the scheduler 210 can include a content feature extractor 212, a content-aware accuracy predictor 214, and/or a branch selector 216. An example workflow of the scheduler 210 includes (1) extracting the content features via the content feature extractor 212, (2) predicting the accuracy with a content-aware accuracy predictor via the content-aware accuracy predictor 214, and then (3) using a branch selector to choose the optimal branch via the branch selector 216. Particularly, given a tracking-by-detection scheme in the MBODF 220, where a group of frames (GoF) can be a unit for scheduling, the video frame 202 is related to the GoF. In a streaming video scenario, the scheduler 210 can select an execution branch at any frame $x_t$ in the streaming video. The frame $x_t$ can be an initial or first frame in the GoF. In some examples, the size of the GoF can be between 1 and 100 frames for the framework 200. The size of the GOF can be pre-fixed or determined at inference time. It should be appreciated the size of the GoF can be any suitable size of frames.

Figure 3:
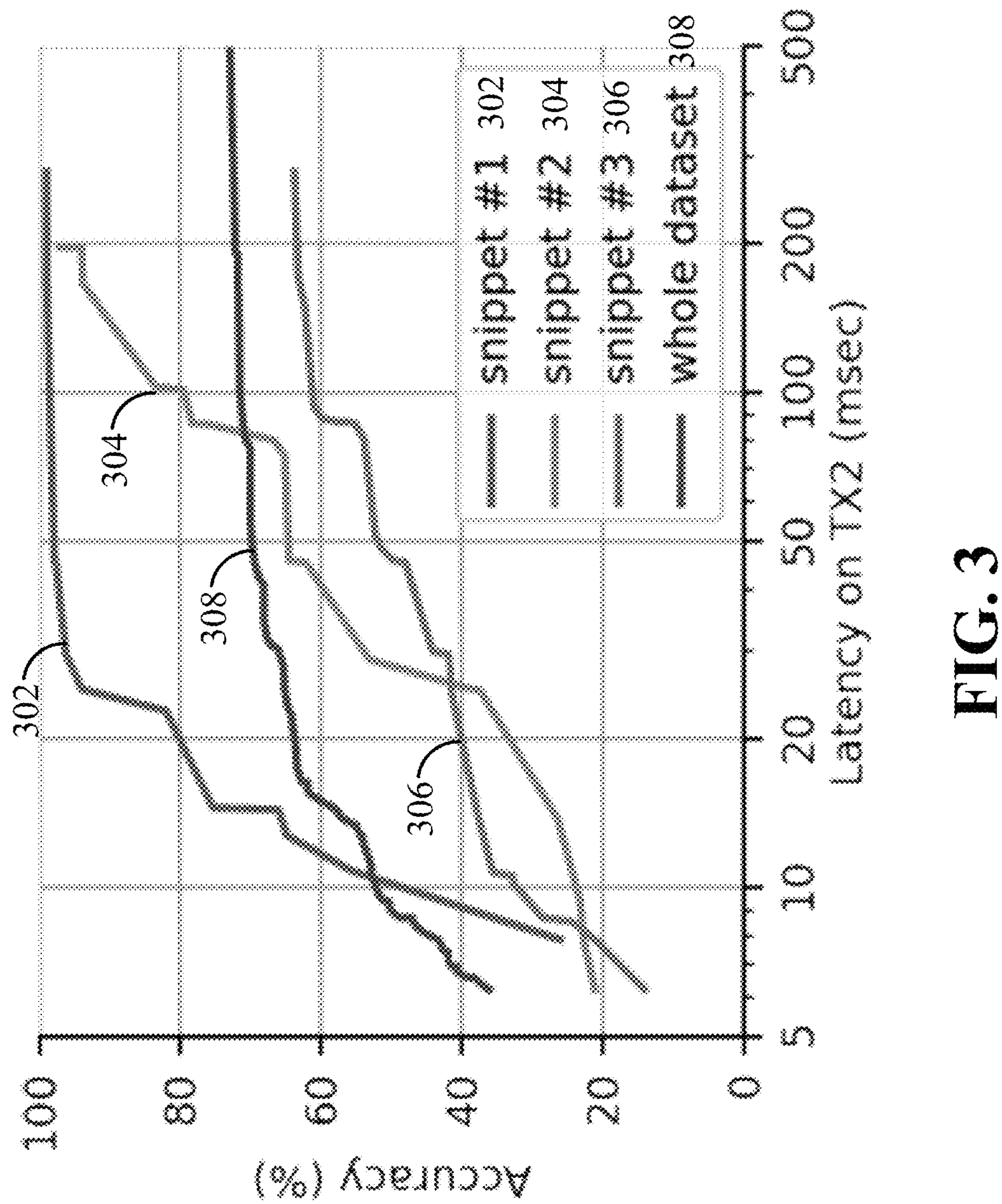
FIG. 3 illustrates Pareto optimal branches according to some embodiments.

As the execution branch selection by the scheduler 210 is based on the current frame 202 and, in some examples, also based on one or more future frames in the GoF, the scheduler 210 can leverage the content characteristics in the video frame 202 and, in some examples, the GoF to increase or maximize accuracy. Thus, the scheduler 210 may be referred to as a content-aware scheduler. In contrast, a content-agnostic scheduler considers the average accuracy of different branches across an entire dataset (not individual frames or groups of frames), which loses the nuances of the snippet-level video characteristics. For example, FIG. 3 shows accuracy-latency frontiers 302, 304, and 306 for Pareto optimal branches for three randomly selected video snippets of a video dataset, each snippet having different content characteristics. FIG. 3 further shows an accuracy-latency frontier 308 for the Pareto optimal branch for the entire dataset 308. As shown in FIG. 3, the accuracy-latency frontiers 302, 304, and 306 vary significantly from snippet to snippet and are different from the frontier 308 for the "average" for the entire dataset. Thus, the use of the content-aware scheduler 210 for identifying the execution branches for a video object detection pipeline can significantly improve the accuracy and reduce the latency and energy consumption. In the experiment of the framework 200, 83.4% branches in the framework 200 are most accurate for at least one video snippet at any latency requirement. Among a dataset of 1,256 video snippets (e.g., derived from the ILSVRC VID dataset), 627 unique sets of accuracy-latency frontier branches can be identified. Thus, the optimal branch can be determined for a given video snippet rather than use a single branch for an entire dataset. The scheduler 210 can determine the content-specific execution branches in this manner and on-the-fly (at inference time) as described in further detail below.

In some examples, the scheduler 210 can include the content feature extractor 212 to extract feature representation(s). The content feature extractor 212 can build a mapping f(·) from the frame representation or video frame 202 ($\hat{X}$) to its feature representation since the frame representation carries redundancy. The content feature extractor 212 can be discriminative so that the feature values it carries can be used to predict the content-specific accuracy of each execution branch. In some examples, the content feature extractor 212 can be rich in content characteristics, discriminative enough, and lightweight in the computation. In further examples, the content feature extractor 212 can include multiple feature extractors to extract multiple different feature representations. A list of content features, specs, and descriptions according to some examples of the scheduler 212 is summarized in Table 1.

TABLE 1

Feature extractors 212 in the scheduler 212 of the framework 200

| Name | Dim. | Trainable | Description |
|---|---|---|---|
| light | 4 | No | Composed of height, width, number of objects, averaged size of the objects |
| HoC | 768 | No | Histograms of Color on red, green, blue channels |
| HOG | 5400 | No | Histograms of Oriented Gradients |
| ResNet50 | 1024 | No | ResNet50 features from the object detector in the MBODF, average pooled over height and width dimensions, and only preserving the channel dimension |

TABLE 1-continued

Feature extractors 212 in the scheduler 212 of the framework 200

| Name | Dim. | Trainable | Description |
|---|---|---|---|
| CPoP | 31 | No | "Class Predictions on the Proposal" feature (CPoP) from the object detector of the MBODF, averaged pooled over all region proposals, and only preserving the class dimension (including a background class) |
| MobileNet | 1280 | Yes | Efficient, effective feature extractor, average pooled from the feature map before the fully-connected layer, and only preserving the channel dimension |

In some examples, the content feature extractor 212 can extract light features (examples of feature representations) that come with no cost to extract from the video frame 202. For example, the light features can include the height and width of the video frame 202, the number of objects in the video frame 202, and/or the average size of the objects in the video frame 202. In further examples, the content feature extractor 212 can extract vision feature representations (e.g., Histograms of Color (HoC), Histograms of Oriented Gradients (HOG), any other suitable vision feature) to characterize the color and gradient information. In further examples, as the object detector itself is a neural network with intermediate features, the content feature extractor 212 can extract feature representations from a layer of the object detector 222. In some examples, the content feature extractor 212 (e.g., ResNet50, CPoP, etc.) can use the features of the last video frames, which were used in the object detector. Thus, the execution can flow from the scheduler 210 to MBODF 220 for a current video frame 202. In some examples, the content feature extractor 212 can extract an average value pooled from the layer after the feature extractor head of Faster R-CNN backbone (e.g., ResNet-50), and a value from the prediction logits on the object classes. These two feature representations incur no extra computation cost, yet encode the object information within videos. In further examples, the content feature extractor 212 can use a DNN-based feature extractor (e.g., a retrainable machine learning model, MobileNetV2). The retrainable machine learning model is lightweight in terms of the computation cost and jointly trainable with the downstream content-aware accuracy predictor 214. In some examples, at inference time, the scheduler 210 can run ahead of the MBODF 220 and thus rely on extracted content features from the previous GoF. Due to the temporal smoothness in video frames, this simplification can work in practice.

In some examples, the scheduler 210 can include the content-aware accuracy predictor 214 to predict multiple accuracy indications based on the feature representations extracted by the content feature extractor 212. Each of the accuracy indications may correspond to a respective execution configuration that may be selected (also referred to as potential or selectable execution configurations). The accuracy indication for a particular execution configuration may serve as an accuracy metric for that execution configuration. The execution configurations may also be associated with a latency metric and an energy metric. In some examples, to generate the accuracy indications, the content-aware accuracy predictor 214 can provide the multiple feature representations to a machine learning model (e.g., of the predictor 214). The machine learning model can include a feature projection layer and a multi-layer fully connected neural network with a rectified linear unit (ReLu). The feature projection layer can project the multiple feature representations to multiple fixed vector. The multi-layer fully connected neural network with the rectified linear unit (ReLu) can receive the fixed vectors from the feature projection layer. The content-aware accuracy predictor 214 can generate potential execution configurations. In some examples, the content-aware accuracy predictor 214 can generate potential execution configurations that satisfy the latency and/or energy requirements (e.g., a latency metric below a latency limit and/or a energy metric below an energy limit).

The scheduler 210 may also include the branch selector 216 to determine or select an execution configuration from the potential execution configurations. As described in further detail below, this selection may be based on the accuracy metric (e.g., as determined by the content-aware accuracy predictor), the latency metric, and the energy metric of the execution configuration relative to the metrics of other potential execution configurations. In some examples, the branch selector 216 may select the execution configuration having the highest accuracy indication of the accuracy indications among the potential execution configurations. In further examples, the branch selector 216 may select the execution configuration having the highest accuracy indication in combination with a latency metric below a latency limit and/or energy metric below an energy limit.

In some examples, the content-aware accuracy predictor 214 and/or the branch selector 216 can filter the potential execution configurations based on the latency metric and the energy metric to provide a subset of the potential execution configurations meeting the latency metric and the energy metric. In such examples, the content-aware accuracy predictor 214 can predict accuracy indications for this subset of potential execution configurations (also referred to as the subset of accuracy indications) without additionally providing accuracy indications for the filtered-out configurations, thus reducing the amount of processing performed. In some examples, the content-aware accuracy predictor 214 and the branch selector 216 can be the same device or separate devices to provide a subset of the potential execution configurations meeting the accuracy, latency, and/or energy metrics and/or select an optimal or an execution configuration.

Returning to the content-aware accuracy predictor 214, in some examples, the content-aware accuracy predictor 214 can embed the latency metric and the energy metric on separate feature vectors using multi-layer perceptrons.

In some examples, the content-aware accuracy predictor 214 can build a mapping $a(\cdot)$ from the feature representation $f(\hat{X})$ to the accuracy of a given execution configuration or branch b. Considering the framework 200 with $m=|M|$ independent configurations (i.e., a set of all possible configurations) and $b\in\{b_1, b_2, \ldots, b_m\}$ that are capable of finishing the object detection task on streaming videos, the scheduler model can be formulated as follows to maximize its accuracy where the latency of the branch can be used as the constraint:

$$b_{opt}=\arg\max_b a(b,f(\hat{X})), s.t.\ l(b,\hat{X})\leq l_0. \quad (1)$$

In some examples, the latency metric $l(b,\hat{X})$ of an execution configuration can be affected by many factors. For example, due to the different computation capabilities of embedded boards, the latency on each board is different. Also, the power mode of the device and the resource contention also affect the runtime latency of an execution branch. To minimize the profiling cost, the following two techniques can be used. First, the latency can be profiled on sample videos instead of on the entire dataset. This is because the latency of each execution configuration can be consistent across video frames and does not require such large amount of profiling data. Second, the profiling can be decoupled on the object detector and the object tracker. This decoupling can allow to profile object detector configurations and object tracker configurations, separately, and the following Equation 2 can be used to calculate the overall latency due to the "tracking-by-detection" design.

$$l(b,\hat{X}) = \frac{l_{detector}(b,\hat{X}) + (i-1) * l_{tracker}(b,\hat{X})}{i}, \quad (2)$$

where $I_{detector}(b,\hat{X})$ denotes the detector latency of configuration b, $I_{tracker}(b,\hat{X})$ denotes the tracker latency of configuration b, and i is the number of group of frames that matches the detector interval.

In some examples, the accuracy prediction metric $a(b,f(\hat{X}))$ of a configuration or a branch can be profiled in the offline training dataset and can be used in the online or runtime phase. In some examples, the accuracy of each branch stays the same in the online or runtime phase since both the offline training dataset and the online test dataset follow an independent and identical distribution. Considering the accuracy is meaningful given a large enough dataset and the number of configurations or execution branches is large, the cost of offline profiling is significant. Thus, the three following techniques can be used to speed up the profiling. First, the inferior branches in terms of accuracy and efficiency can be filtered out of the potential branches, while the remaining potential branches that are efficient yet effective are available for selection. For example, in some embodiments, only branches with SSD or EfficientDet are available for selection for object detection. Second, the high-end servers can be used to profile the accuracy of each configuration since the MBODF 220 produces deterministic and consistent results between servers and embedded devices. Finally, the profiling leverages the fact that the configurations with the same configurations except for detector internal i can reuse the object detection results on the frames where the object detector runs. In some examples, the accuracy of all configurations can be profiled with i=1 (object detector only), save the detection results, then the accuracy of other execution branches can be profiled, and the saved detection results can be reused.

In other examples, the content-aware accuracy predictor 214 and/or the branch selector 216 can select the execution configuration (e.g., the optimal execution branch) to satisfy the energy and latency requirements at the same time, while maximizing the accuracy. For example, the content-aware accuracy predictor 214 and the branch selector 216 can solve the following optimization problems:

$$b_{opt} = \arg\max_b a(b,f(\hat{X})), s.t.\ e(b,\hat{X}) \leq e_0, l(b,\hat{X}) \leq l_0, \quad (3)$$

where $a(b,f(\hat{X}))$, $e(b,\hat{X})$, and $l(b,\hat{X})$ are the accuracy metric, the latency metric, and the energy metric for configuration or branch b, respectively. In some examples, energy, latency, and the accuracy profile of each configuration or branch can be collected offline. Then, the energy, latency, and accuracy prediction models can be trained. These models can be used during the online phase so as to finish the task of the scheduler 210. In some examples, the energy consumption $e(b,\hat{X})$ of an execution configuration or branch b can be measured by calculating the average energy consumption of processing a single frame for each branch. In some examples, the energy consumption can be profiled on sample videos instead of the entire dataset and measure the overall energy consumption of each execution branch. This approach may be used because the overall energy consumption of each execution branch can be consistent across video frames and does not require such large amount of profiling data. Since the exact energy consumption of a specific process on the embedded devices could not be measured, the overall energy consumption of the board can be used as the energy metric. In some examples, the following Equation 4 can be used, where N represents the number of frames within the video, p(t) represents the instantaneous power measured at every 1 second interval, and T represents the overall time of inference.

$$e(b) = \frac{\sum_{t=1}^{T} p(t)}{N * T}. \quad (4)$$

In some examples, the energy metric (i.e., $e(b,\hat{X})$) and the accuracy metric (i.e., $a(b,f(\hat{X}))$) can be substantially similar to those in Equation 1 above.

To match stringent users' efficiency requirements—energy or latency—of inference at real-time (e.g., 30 or 50 FPS) on embedded devices, the low overhead of the branch prediction models can be prioritized. The implementation of lightweight prediction models comes with the benefit of low overhead. In some examples, the overall latency overhead of the scheduler 210 is less than 1 millisecond (ms) on a set of Jetson boards (0.16 ms on AGX Xavier, 0.26 ms on Xavier NX, and 0.19 ms on TX2), which is marginal compared to the typical real-time frame rate of 30 FPS. In further examples, this overhead includes all of the branch selection time and the branch switching time. Overall, with lightweight prediction models and low overhead of the scheduler, the framework 200 can dynamically adapt at runtime based on changes in user-specified latency and/or energy requirements.

In some examples, the content-aware accuracy predictor 214 can determine the accuracy of all configurations or branches given a feature vector or the multiple feature representations. In some examples, a 5-layer fully connected neural network (NN) can be used with a rectified linear unit (ReLU), 256 neurons in all hidden layers, and residual connections. As the dimensions of the light features and other features vary significantly in 1 to 3 orders of magnitude, a feature projection layer can be added before the feature representations are concatenated and fed into the 5-layer NN. In some examples, the feature projection layer can project the feature representations (e.g., the light features and/or other high-dimensional features) to fixed 256-dimensional vectors so that the fixed 256-dimensional vectors are equally representative in the accuracy predictor. In further examples, MSE loss can be used, and the NN can be trained on a derived snippet-granularity dataset (e.g., from ILSVRC VID), where the ground truth accuracy of the branches are profiled offline.

In some examples, the branch selector 216 can include a neural network that jointly models content and latency requirement for branch selection. In some examples, the branch selector 216 may not pair with the content-aware accuracy predictor 214. In some examples, the branch selector 216 can embed content and latency requirements into separate feature vectors using multi-layer perceptrons (MLPs). In further examples, the branch selector 216 can regress a set of affine weights $\gamma$ and biases $\beta$ from the latency feature $F_l$ using another MLP and subsequently transform the content feature $F_c$ as $F_c'=\gamma\cdot F_c+\beta$. In doing so, the branch selector 216 can adapt to the current latency requirement through the modulation of content features. An MLP can further process the modulated content features $F_c'$ and predict accuracy of all configurations. In some examples, the branch selector 216 can be trained using the same MSE loss as before, except that the target accuracy of a configuration is set to zero when the latency requirement is violated.

Figure 4B:
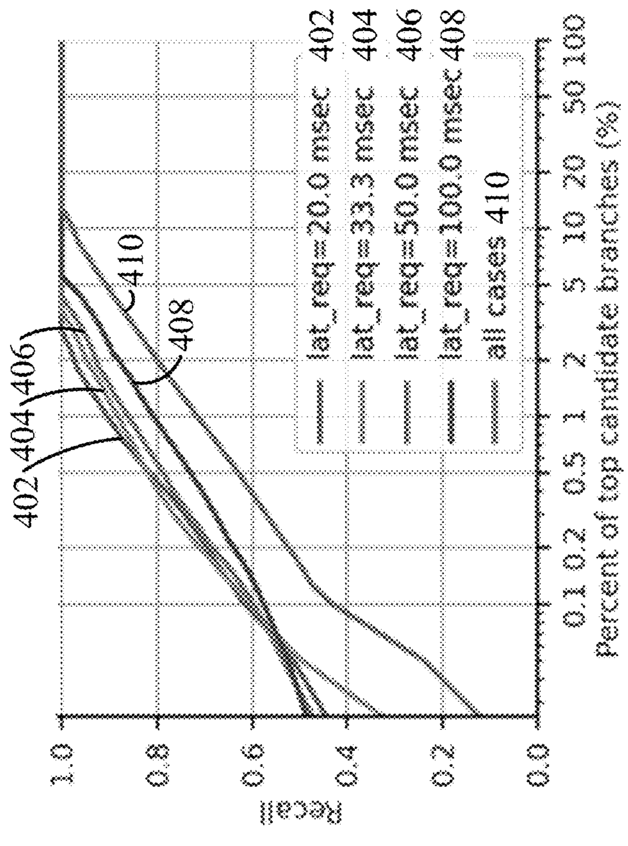
FIG. 4B illustrates a second example of candidate branches to select according to some embodiments.
Figure 4A:
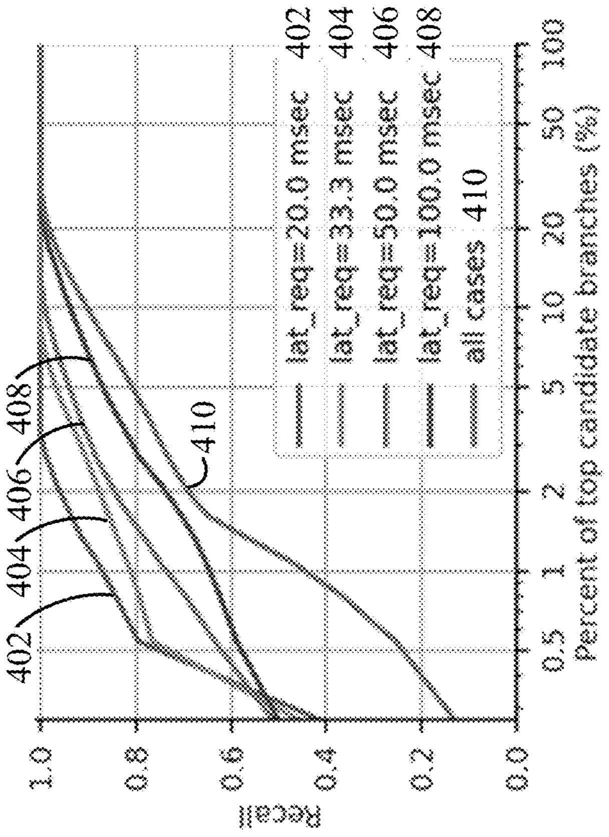
FIG. 4A illustrates a first example of candidate branches to select according to some embodiments.

Predicting on thousands of execution branches can be challenging, for example, in terms of computational workload given potential timing constraints. Thus, in some examples, the framework 200 narrows down the number of candidate execution branches in the design phase to a subset of top K execution branches. The top K execution branches can cover the majority of optimal configurations or branches across videos of different content characteristics and different latency constraints, for properly chosen K. The method called Optimal Branch Election (OBE) can be used to select the K candidate configurations or branches. FIG. 4A shows the recall of using K branches (proportion where the optimal branch belongs to one of the top K), rather than all 368 branches. In FIG. 4A with the 368-branch MBODF, 10.1% configurations or branches suffice to achieve 90% recall. Also, if the candidate configurations or branches are considered for a particular latency constraint, even fewer can be considered. To achieve a 90% recall, the percentages of K configurations are 1.4%, 2.7%, 3.3%, and 7.1%, given 20, 33.3, 50, and 100 millisecond (ms) latency constraints 402, 404, 406, 408, respectively. FIG. 4B shows such relation on a larger-scaled MBODF with 3,942 branches, with a lower ratio of configurations or branches that can be considered. Thus, using top K candidates can effectively reduce the cost of online scheduling and offline profiling.

In some examples, a snippet-granularity dataset can be derived to study the content-aware accuracy of the execution branches. Given a video dataset $\{v_1, v_2, \ldots v_h\}$ with h videos, each video can be clipped into l-frame video snippets, and each video snippet can be a unit for evaluating content-specific accuracy. Too small an l value makes mAP meaningless, and too large an l, reduces the content-aware granularity. In some examples, l=100 can be chosen (e.g., for the ILSVRC 2015 VID dataset). To further enlarge the training dataset, sliding windows can be used to extract more video snippets. Supposing a temporal stride of s frames, every l-frame snippet starting at the frame whose index is the multiple of s is selected as a video snippet (we use s=5), enlarging the training dataset by a factor of l/s. In further examples, the content-aware accuracy predictor(s) 214 can be trained for 400 epochs, with a batch size of 64, a weight decay of 0.01, and an SGD optimizer of fixed learning rate of 0.01, and momentum of 0.9.

Figure 5:
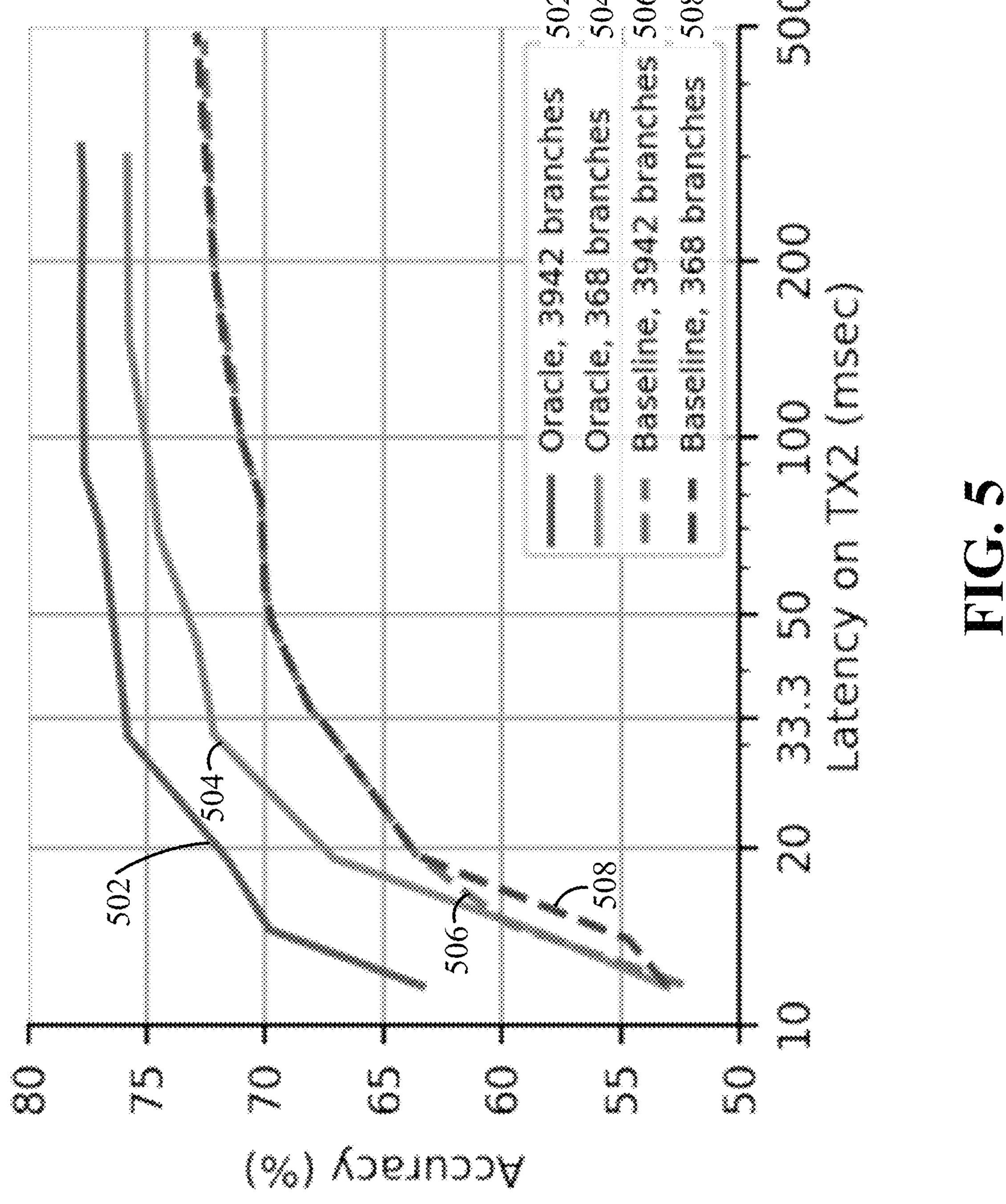
FIG. 5 illustrates an example upper bound performance of a content-aware scheduler according to some embodiments.

In some examples, the framework 200 can include a perfect content-aware scheduler for an MBODF M, referred to as an "Oracle" scheduler. Such a scheduler selects the optimal branch $b_{opt}$ to execute. The accuracy-latency performance of an Oracle scheduler can establish the upper-bound performance of a content-aware scheduler. To realize an Oracle scheduler, three impractical powers can be granted to the Oracle scheduler—(1) it has access to the future frames in the GoF, (2) it has the annotation of the objects to calculate the ground truth accuracy $a(b, f(\hat{X}))$ so that no predictions are performed, (3) it exhaustively tests all available branches and selects the most accurate one, subject to the latency constraint. FIG. 5 shows, for comparison, performance of the Oracle scheduler on two 5-knob MBODF instantiations, with 3,942 (502) and 368 (a subset 504) configuration branches along with performance of a content-agnostic scheduler, which chooses a single static configuration or branch for the entire dataset. In some examples, the Oracle scheduler has a 3.2% to 4.6% mAP improvement in the 368-branch MBODF 508 at 10, 20, 30, and 50 FPS, four typical latency constraints on mobile devices. This is relative to the baseline with 368 branches (508). Interestingly, the mAP improvement of the Oracle scheduler is higher for the 3,942-branch MBODF 506, 6.6%-8.3%, compared to the above-mentioned 3.2%-4.6% (which is for the 368-branch MBODF 508). In contrast, such large-scaled MBODF has little or no benefit in the content-agnostic setting. The large gap motivates a content-aware scheduler that can adapt over a large and fine-grained range of knobs.

In some examples, the framework 200 can further include the MBODF 220. The MBODF 220 can include an object detector 222, an object tracker 224 to perform the object detection or the object tracking at inference time based on the video frame and the execution configuration, which was determined by the scheduler 210.

In some examples, a GoF can be defined as a sequence of di (detection interval) consecutive frames in a streaming video, in which object detector(s) 222 (e.g., Faster R-CNN, EfficientDet, YOLO, etc.) are used on the first frame, and object tracker(s) 224 (e.g., MedianFlow, KCF, etc.) on the remaining frames. In the streaming scenario, as the video is processed frame-by-frame, an object detector 222 can run on any frame with no prerequisite while an object tracker 224 depends on the detection results, either from a detector 222, or from the tracker 244 on the previous video frame. For example, the framework 200 receives a first video frame and a second video frame, which is subsequent to the first video frame. Then, the electronic processor via the MBODF 220 can perform the object detection based on the first frame and perform the object tracking based on the second frame and based in part on the object detection for the first frame. In some examples, the object detector 222 can be implemented with a Faster R-CNN object detector (e.g., in PyTorch, with mobile GPU), and the object tracker 224 can be implemented with a MedianFlow object tracker (e.g., in OpenCV, with mobile CPU). Then, the object tracker 224 along with the object detector 222 can boost efficiency and run up to 114×faster than the object detector 222 without using the object tracker 224.

To further improve the efficiency and avoid a large accuracy reduction, tuning knobs can be used for this tracking-by-detection scheme. In some examples, the execution configuration can be defined by a unique set of values for multiple tunable knobs. In further examples, the multiple tunable knobs can include: (1) a detector interval detector interval (di), controlling how often an object detector 222 is triggered, (2) an input resolution of a detector 222 (*rd*), controlling the shape of the resized image fed into the object detector, (3) a number of proposals (nprop), controlling the maximum number of region proposals generated from the RPN module of the Faster R-CNN detector, (4) an input resolution of a tracker (rt), controlling the shape of the resized image fed into the object tracker 224, and/or (5) a confidence threshold to track (ct), controlling a minimum threshold on the confidence score of the objects below which the objects are not tracked and output by the tracker.

In some examples, each tunable knob can be an independent dimension on a configuration space. In some examples, the multi-knob design can lead to a combinatorial configuration space as each knob can be tuned independently and in various step sizes. This allows for a wide range of adaptations. In further examples, for the performing of the object detection, the multiple configurations can be determined by a detector knob. In some examples, the detector knob can include at least one of: the detector interval, the input resolution, or the number of proposals. In further examples, for the performing of the object tracking, the multiple configurations can be determined by a tracker knob. The tracker knob can include at least one of the input resolution of the tracker or the confidence threshold. In some examples, the MBODF 220 can save information of the last or previous video frame and the coordinates of objects in the last or previous video frame. Then, the MBODF 220 can provide the information of the last or previous video frame to the object tracker 224 as a reference so that the object tracker 224 can determine the location of the objects in the current frame. Further, the parameter to control determining whether a video frame is provided to an object detector 222 or an object tracker 224 can include the detector interval (di). Thus, for every di frame, the first frame can be provided to the object detector 222 and the remaining di frames can be provided to the object tracker 224. In further examples, di is another control parameter that the scheduler 210 sends to the MBODF 220.

In some examples, the ranges and step sizes of values for each knob can be determined by evaluating the accuracy-latency-energy relation on each knob. Then the ranges and step sizes can be determined according to the monotonic ranges of such relation and the constraints of each knob. In some examples, the MBODF 220 can be implemented on top of Faster R-CNN (a 368-branch and a 3,942-branch variant), EfficientDet, YOLOv3, and SSD. Table 2 below shows five tuning knobs for an example of the Faster R-CNN object detector.

Figure 6:
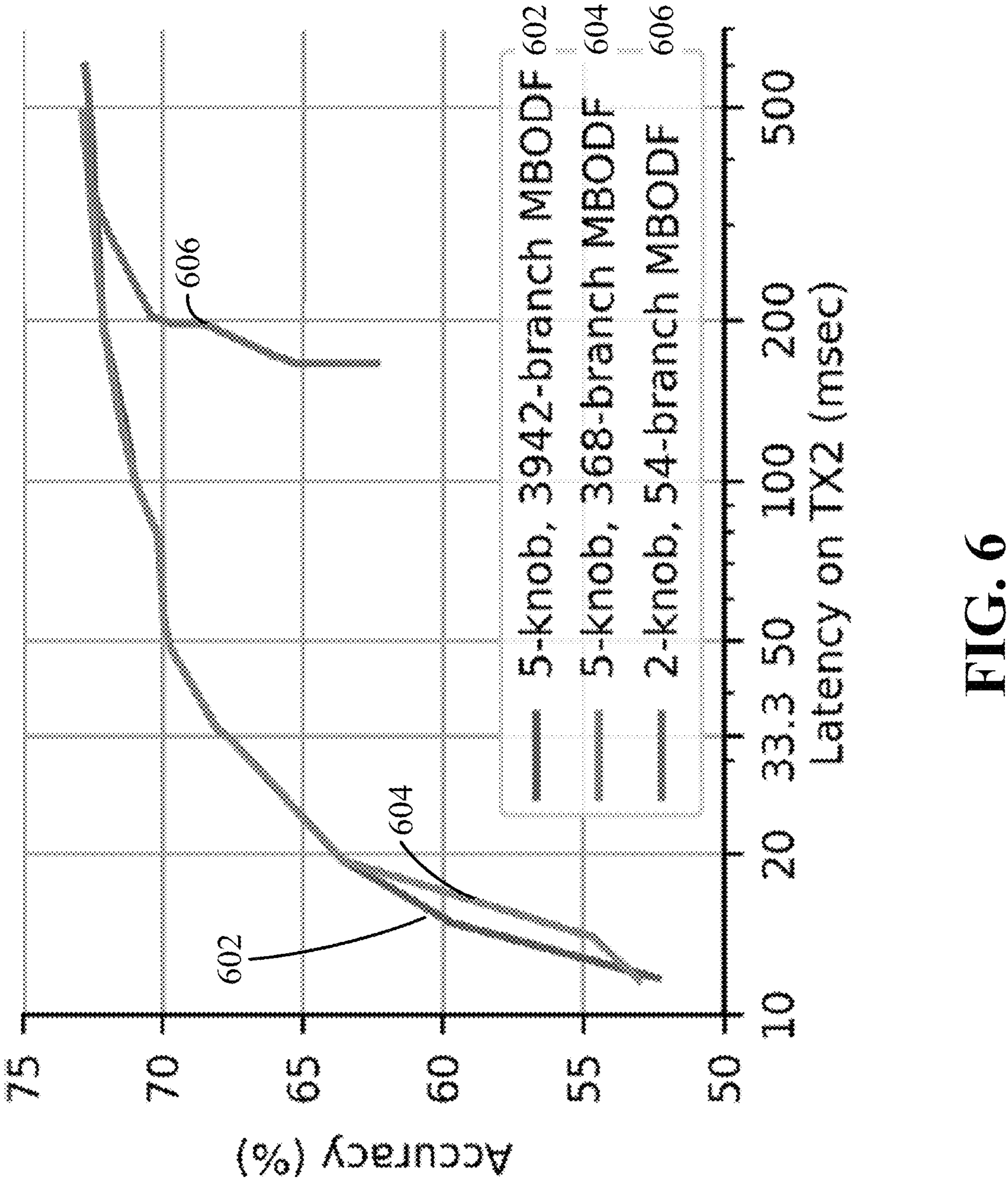
FIG. 6 illustrates an example accuracy comparison of different knob multi-branch object detection frameworks according to some embodiments.

FIG. 6 shows an accuracy comparison between a 2-knob 54-branch MBODF 606, a 5-knob 368-branch MBODF 604, and a 5-knob 3,942-branch MBODF 602, where each point on the Pareto optimal curve stands for the accuracy and latency performance of a single branch (e.g., on the ILSVRC VID dataset). In some examples, a 5-knob MBODF is much more efficient than a 2-knob MBODF 606 (rd and nprop). It achieves a 6.1× speedup, with only a 2.41% mAP reduction, compared to 3.0× speedup, with a 2.37% mAP reduction in the 2-knob MBODF 606. In contrast, the 5-knob 3,942-branch MBODF 602, with 10× more branches, is only slightly better than the 5-knob 368-branch MBODF 604 at any given value of a latency constraint. The root cause of such reduced accuracy improvement is the lack of smarts in choosing the execution branch conditioned on the video content. In other words, by only applying a single static branch on the entire dataset, without finer-grained content revelations, the MBODF 602 cannot reap the benefit of the much larger-scaled MBODF. However, when the MBODF 602, 604, or 606 is used as the MBODF 220 with the scheduler 210 of the framework 200, as proposed herein, an optimal execution configuration or branch of the MBODF 220 is determined at inference time based on the content features of the video frame and multiple metrics to increase accuracy and latency performance. Thus, the framework 200 can include a tailored set of execution configurations and can schedule the optimal configuration at inference time. The framework 200 can adapt to a wide range of latency requirements (range of 40×), on a mobile GPU device (e.g., NVIDIA Jetson™ TX2) and outperform a content-agnostic MBDOF baseline by 20.9%-23.6% mAP.

TABLE 2

Choices of the tuning knobs in the MBODF with Faster R-CNN object detector in the 368-branch variant (*indicates additional choices in the 3,942-branch variant).

| di | rd | nprop | rt | ct |
|---|---|---|---|---|
| 1, 2, 4, 8, 20, 50, 100* | 224*, 352, 384, 288, 320, 416*, 448*, 480*, 512* | 3*, 5*, 10*, 20*, 100, 1000 | 25%, 50%, 100% | 0.05, 0.1, 0.2, 0.4* |

In some examples, the multi-knob tracking-by-detection scheme with the defined tunable knobs and defined range and step sizes for each tunable knob may be referred to as the MBDOF. In other words, the MBDOF (e.g., MBODF 220) may be defined by the set of available execution configurations or branches available for selection. That is, as previously noted, an execution configuration or branch in the MBODF 220 is defined by the set of values of each tunable knob. In some examples, not every branch in the configuration space is valid (e.g., some combinations of values for the tunable knobs are not valid and do not define a separate or unique selectable execution configuration). For example, for configurations or branches that run an object detector on every frame (di=1), the rt and ct knobs (which are specific to the object tracker 224) are not relevant.

Example Object Detection Process

Figure 7:
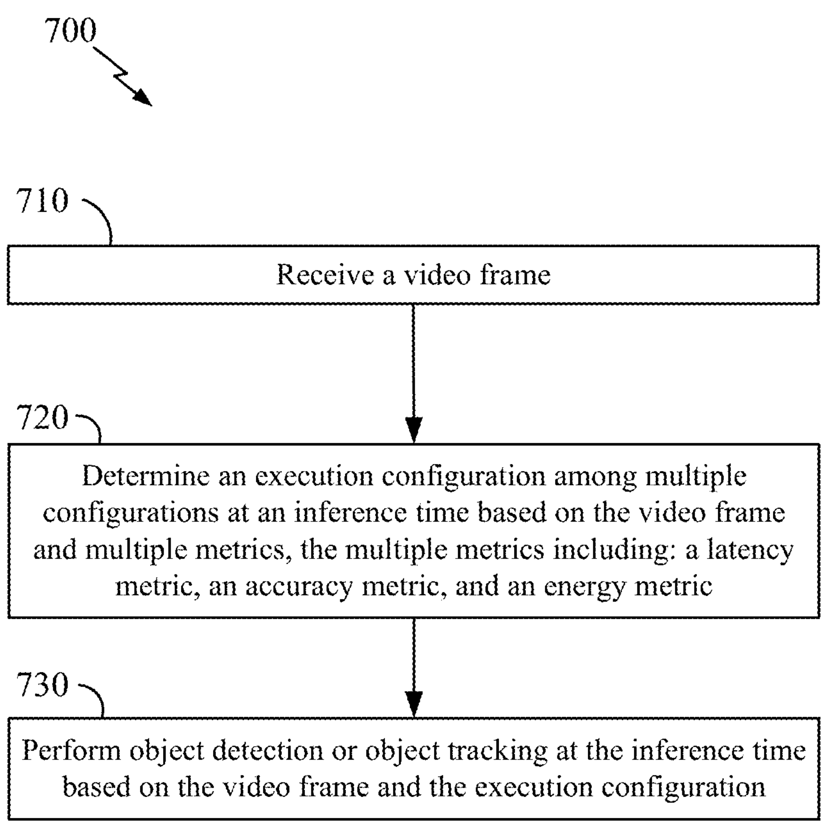
FIG. 7 is a flow diagram illustrating an example process for object detection according to some embodiments.

FIG. 7 is a flow diagram illustrating an example process 700 for object detection in accordance with some aspects of the present disclosure. As described below, a particular implementation can omit some or all illustrated features/steps, may be implemented in some embodiments in a different order, and may not require some illustrated features to implement all embodiments. In some examples, an apparatus (e.g., computing device 110, electronic processor 112 with memory 114, etc.) in connection with FIG. 1 can be used to perform example process 700. In some examples, the apparatus (e.g., computing device 110, electronic processor 112 with memory 114, etc.) implement the framework 200 of FIG. 2 to perform the example process 700. In the below description, the example process 700 is described as being carried out by the processor 112 of FIG. 1 and, more specifically, by the processor 112 implementing the framework 200 of FIG. 2. However, it should be appreciated that any suitable apparatus or means for carrying out the operations or features described below may perform process 700.

At block 710, the electronic processor 112 receives a video frame. For example, with reference to FIG. 2, the framework 200 (implemented by the processor 112 of FIG.

1), and more specifically, the scheduler 210, receives the video frame 202. The video frame 202 may be received, for example, from a network-connected device (e.g., camera 102) via the communication network 108 or by a camera (e.g., the camera 102) integrated into a device with the processor 112 (e.g., the computing device 110). In some examples, the video frame can be a first or initial video frame of a video steam (e.g., including at least a second video frame subsequent to the first video frame) that is received by the electronic processor 112 (e.g., at the scheduler 210). In other examples, the video frame is a second or subsequent video frame of a video steam that is subsequent to a first video frame that was previously received by the electronic processor 112 (e.g., at the scheduler 210). (e.g., including at least a second video frame subsequent to the first video frame) that is received by the electronic processor 112 (and scheduler 210). In some examples, the video frame can be a first video frame or another video frame in a group of frames (GoF). In some examples, the GoF can be defined as a sequence of di (detection interval as a tuning knob) consecutive frames in a streaming video, on which object detector(s) is run. In some examples, the GoF indicates how often the object detector is run on a streaming video. For example, when the detection interval is eight, the GoF is eight, and the first frame of the GoF is used for the object detector 222 while the remaining seven frames of the GoF are used for the object tracker 224. In some examples, the GoF can be predetermined or dynamically determined based on the content of the video frame.

At block 720, the electronic processor 112 determines an execution configuration among multiple configurations at an inference time based on the video frame and multiple metrics. In some examples, the inference time can include or be defined as a time period from when the current frame is received to when the subsequent frame is received. In other words, the execution configuration may be determined by the electronic processor 112 after the video frame 202 is received. Also, during the inference time, the electronic processor 112 can process a query or a vision task for the video frame 202 and provide an answer to the query (e.g., perform block 730, described further below). In some examples, the multiple metrics can include a latency metric, an accuracy metric, and an energy metric.

In some examples, an execution configuration determined in block 720 can include or be defined by a unique set of hyperparameter values (also referred to as "tunable knobs" or "knobs" values or settings) used to configure the object detection and/or object tracking algorithm implemented by an MBODF (e.g., the MBODF 220). Accordingly, in some examples, to determine an execution configuration, the electronic processor 112 determines the unique set of hyperparameter values to define the execution configuration. The set of hyperparameter values may be selected so as to accomplish a vision task (object detection or objection tracking) with a certain accuracy (e.g., maximum accuracy, accuracy above an accuracy threshold, accuracy within an accuracy range), with a certain latency (e.g., minimum latency, below a latency threshold, within a latency range), and/or with a certain energy consumption (e.g., minimum energy consumption, below an energy consumption threshold, within an energy consumption range). Accordingly, the selected set of hyperparameters may enable execution of a vision task in a distinct and fixed execution time (latency), with a low energy consumption, and/or with a consistent or acceptable accuracy across a dataset or video. In some examples, the hyperparameters or tunable knobs can include at least one selected group of: a detector interval, an input resolution of a detector, a number of proposals, an input resolution of a tracker, and a confidence threshold. In some examples, each of the tunable knobs is an independent dimension on a configuration space. In some examples, each tunable knob can be considered as a detector knob (e.g., a detector interval, an input resolution, and/or a number of proposals) for object detection and/or a tracker knob (e.g., an input resolution of a tracker and/or a confidence threshold) for object tracking.

In some examples, to determine the execution configuration, the electronic processor 112 uses the scheduler 210, as described above with respect to FIG. 2. For example, the content feature extractor 212 may receive and processor the video frame 202 to extract feature representations of content of the video frame 202, as described above. Further, as described above, the content-aware accuracy predictor 214 may receive and process the extracted feature representations to determine accuracy predictions (accuracy indications or metrics) for each of multiple available execution configurations. Additionally, as described above, the content-aware accuracy predictor 214 or branch selector 216 may determine an energy metric and/or latency metric for each of the available execution configurations. The branch selector 216 may select, based on the accuracy metric, energy metric, and/or latency metric, the execution configuration from the available execution configurations based on these metrics.

In some examples, to determine the execution configuration, the electronic processor 112 uses the content feature extractor 212, as described above with respect to FIG. 2. For example, the content feature extractor 212 can extract multiple feature representations (e.g., a height, a width, a number of objects, an averaged size of the objects, histograms of color, histograms of oriented gradients, ResNet50 features, CPoP features, MobileNet features, etc.) from the video frame 202. Further, the content feature extractor 212 can extract the multiple feature representations using multiple feature extractors. Additionally, some feature representations can be light feature representations to reduce computing resources to extract while other feature representations can be heavy feature representations to improve accuracy in predicting the multiple accuracy indications. In some examples, a first feature extractor of the content feature extractor 212 can include a retrainable machine learning model (e.g., MobileNet) configured to receive the video frame and produce a first feature representation of the plurality of feature representations.

In some examples, to determine the execution configuration, the electronic processor 112 can uses the content-aware accuracy predictor 214, as described above with respect to FIG. 2. For example, the content-aware accuracy predictor 214 can predict multiple accuracy indications corresponding to the multiple configurations based on the multiple feature representations. In some examples, to predict the multiple accuracy indications, the content-aware accuracy predictor 214 can provide the multiple feature representations for each of the multiple configurations to a first machine learning model and obtain the multiple accuracy indications corresponding to the multiple configurations from the first machine learning model. Further, the first machine learning model can include a feature projection layer to project the multiple feature representations to multiple fixed vectors and a multi-layer fully connected neural network with a rectified linear unit (ReLu) configured to receive the multiple fixed vectors. Additionally, the content-aware accuracy predictor

214 can determine the execution configuration based on the plurality of accuracy indications, the latency metric, and the energy metric.

In some examples, to determine the execution configuration, the electronic processor 112 uses the content-aware accuracy predictor 214 or the branch selector 216. For example, the content-aware accuracy predictor 214 or the branch selector 216 can filter the multiple configurations based on the latency metric and the energy metric for a subset of the multiple configurations meeting the latency metric and the energy metric. In further examples, to predict the multiple accuracy indications, the content-aware accuracy predictor 214 can predict a subset of the multiple accuracy indications. In some examples, the subset of the multiple accuracy indications can correspond to the subset of the multiple configurations. Further, the execution configuration can be the highest accuracy indication of the subset of the plurality of accuracy indications. In some examples, the branch selector 216 can determine the execution configuration, which is an optimal configuration meeting the accuracy metric, the latency metric, and the energy metric, based on Equation 3 described above.

In some examples, the content-aware accuracy predictor 214 or the branch selector 216 can embed the latency metric and the energy metric on separate feature vectors using multi-layer perceptrons. In some examples, the multiple feature representations can be representations being combined with information from the separate feature vectors. For example, the content-aware accuracy predictor 214 or the branch selector 216 can regress weights and biases from the latency feature using another MLP and transform the content feature with the weights and biases. In some examples, the energy metric can include an energy consumption amount indication to process each frame of the group of frames. In some examples, the energy consumption amount can include an average energy consumption amount.

When the video frame received in block 710 is a first video frame in a video stream or GoF, in some examples, the scheduler 210 can determine the execution configuration by determining a value for each detector knob (e.g., a detector interval, an input resolution, and/or a number of proposals). Accordingly, the execution configuration may define the hyperparameter values for the object detection to be performed by the MBODF 220 on the video frame.

When the video frame received in block 710 is a subsequent video frame in a video stream or GoF (i.e., another frame in the video stream or GoF was previously received by the processor 112), in some examples, the scheduler 210 can determine the execution configuration by determining a value for each tracker knob (e.g., an input resolution of a tracker and/or a confidence threshold). Accordingly, the execution configuration may define the hyperparameter values for the object tracking to be performed by the MBODF 220 on the subsequent video frame. In some examples, the scheduler 210 can determine the hyperparameter values for the object tracking based on the processing of the first video frame (e.g., detection of an object).

In some examples, the knobs for object tracking can be determined by the scheduler 210 and before the first frame for the object detection. For example, when the first video frame comes, the scheduler 210 can predict a branch or a configuration based on di=20, rd=288, nprop=100, rt=25%, ct=0.05. For the group of frames (e.g., 20 frames including the current frame), the MBDOF 220 can perform object detection on the first frame with rd=288 and nprop=100 (i.e., detector knob) and perform object tracking on the next 19 frames with rt=25% and ct=0.05 (i.e., tracker knob). Then, when the 21st frame comes, the scheduler 210 can repeat this process. In some examples, the MBODF 220 saves the previous video frame and object coordinates in the previous frame. So, for every frame (e.g., 19 frames) that is provided to the object tracker 224, the object tracker 224 can have information about its previous frame and the object coordinates in the previous frame.

In some examples, the scheduler 210 determines the execution configuration for a video frame in block 710, whether the video frame is a first frame or a subsequent frame in a video stream or GoF, by determining values for both detector knobs and tracker knobs. In such examples, the execution configuration may define the hyperparameter values for both the object detection and object tracking to be performed by the MBODF 220 (e.g., on the video frame and or another frame of a GoF of the video frame).

At block 730, the electronic processor 112 performs a computer vision analysis task at the inference time based on the video frame and the execution configuration. In some examples, the computer vision analysis can include at least one of object detection or object tracking. For example, the MBODF 220, implemented by electronic processor 112, can perform the object detection and/or the object tracking for the video frame as configured by the execution confirmation determined in block 720. In some examples, to perform the computer vision analysis, the electronic processor 112 can perform the object detection for the first video frame in a video stream or GoF based on an object detection machine learning model and the object tracking for the subsequent frame in the video stream or GoF.

In some examples with the first and second video frames, the electronic processor 112 can perform the object detection for the first video frame at the inference time. In further examples, the electronic processor 112 can perform object tracking based on the second video frame and based in part on the object detection for the first frame. Accordingly, for the first video frame (e.g., in the GoF), the object detector detects an object using an execution configuration for the object detection determined in block 720. Then, for the second video frame (i.e., any remaining frame in the GoF other than the first video frame), the object tracker tracks the object (e.g., detected by the object detector in the first video frame) using another execution configuration for the object tracking determined in block 720. Thus, the object detector does not need to detect the object in the second video frame and improves efficiency.

Example Experiment

The experimental results include three parts. First, the example performing models were evaluated over multiple backbone object detectors and were compared with the content-agnostic baselines. Second, ablation studies of the disclosed techniques over the MBODF with Faster R-CNN (FR+MB+CAS) and FastAdapt (FastAdapt+CAS) protocols and study the impact of content-aware techniques were performed. Finally, the benefit of post-processing methods were disclosed on the accuracy and latency cost of both the offline profiling and the online scheduler. Results were reported on the ILSVRC 2015 VID dataset and a snippet-granularity derivative of the dataset, and use different latency constraints to demonstrate the strength of the example method. In the example experiment, 70% mAP accuracy at 20 FPS was achieved, and the accuracy frontier was led at a wide range of latency constraints. Before the results are presented, the evaluation scenario, dataset and metrics, and naming convention for the protocols are summarized.

Streaming Inference: For the efficient and adaptive object detection systems on mobiles, an example usage scenario is to process the videos at the speed of their source, FPS, in the streaming style. This means (1) one may not use the raw video frame or features of video frames in the future to refine the detection results on the current frame, (2) one may not refine the detection results of past frames, and (3) the algorithm can process the video frame-by-frame in the timestamp order. The comparison is discussed with other protocols in the offline mode with post-processing techniques below.

Dataset and Metrics: ILSVRC 2015 VID dataset can be used for the evaluation. Particularly, the example feature extractors and accuracy predictors were trained on the snippet-granularity dataset derived from the ILSVRC 2015 VID training dataset, which contains 3,862 videos. The snippet-granularity dataset of 1,256 video snippets is derived from 10% videos in the training dataset, considering the significant amount of execution branches in our MBODF. The example models are evaluated on both ILSVRC 2015 VID validation dataset and the snippet-granularity dataset. The former contains 555 videos, and object detection performance is evaluated by reporting (1) mean Average Precision (mAP) at IoU=0.5 as the accuracy metric and (2) mean execution latency per frame on the NVIDIA Jetson TX2 as the latency metric. The latter has 1,965 video snippets. Here the accuracy prediction results are evaluated, and Mean Squared Error (MSE), Spearman Rank Correlation (SRC), and Recall of the most accurate branches between the predicted accuracy and the ground truth accuracy are reported.

Protocols: In the example experiment, several protocols that implement a set of techniques for efficient video object detection were formulated. The SOTA object detectors were replicated, and MBODF is created for each model by designing tuning knobs and determining ranges and step sizes for each knob. The variants of the framework 200 (anything with "MB" or content-aware scheduler (CAS) in the name) and baselines are as follows:

- FR+MB The MBODF 220 on top of the Faster R-CNN object detector with ResNet-50 and FPN. A 368-branch and a 3,942-branch variant are included due to the different ranges and step sizes in each knob.
- ED+MB: The MBODF 220 on EfficientDet.
- YL+MB: The MBODF 220 on YOLOv3.
- SSD+MB: The example framework 200 on SSD.
- FastAdapt: An adaptive object detection system with 1,036 approximation branches and a content-agnostic scheduler.
- ApproxDet: Another adaptive object detection system, but less efficient than FastAdapt.
- FR+MB+CAS: The content-aware scheduler 210 with the MBODF 220 on top of Faster R-CNN.
- FastAdapt+CAS: The content-aware scheduler 210 with an off-the-shelf adaptive object detection system.
- AdaScale: an adaptive and efficient video object detection model with a scale knob. A multi-scale (MS) variant as its main design is evaluated, and several single scales (SS) for comparison are included.
- Skip-Cony ED DO: The norm-gate variant of Skip-Cony on top of an EfficientDet DO model can be used. The original implementation only shows MAC and wall time reduction on CPUs. Skip-Cony is evaluated on the mobile GPU to compare with SmartAdapt.
- MEGA RN101: ResNet 101 version of MEGA. In the streaming inference scenario, The accuracy of the still-image object detection baseline in MEGA is reported. This applies to SELSA RN101 and REPP YOLOv3 as well.
- SELSA RN101: ResNet-101 version of SELSA.
- REPP YOLOv3: YOLOv3 version of REPP.

Figure 8:
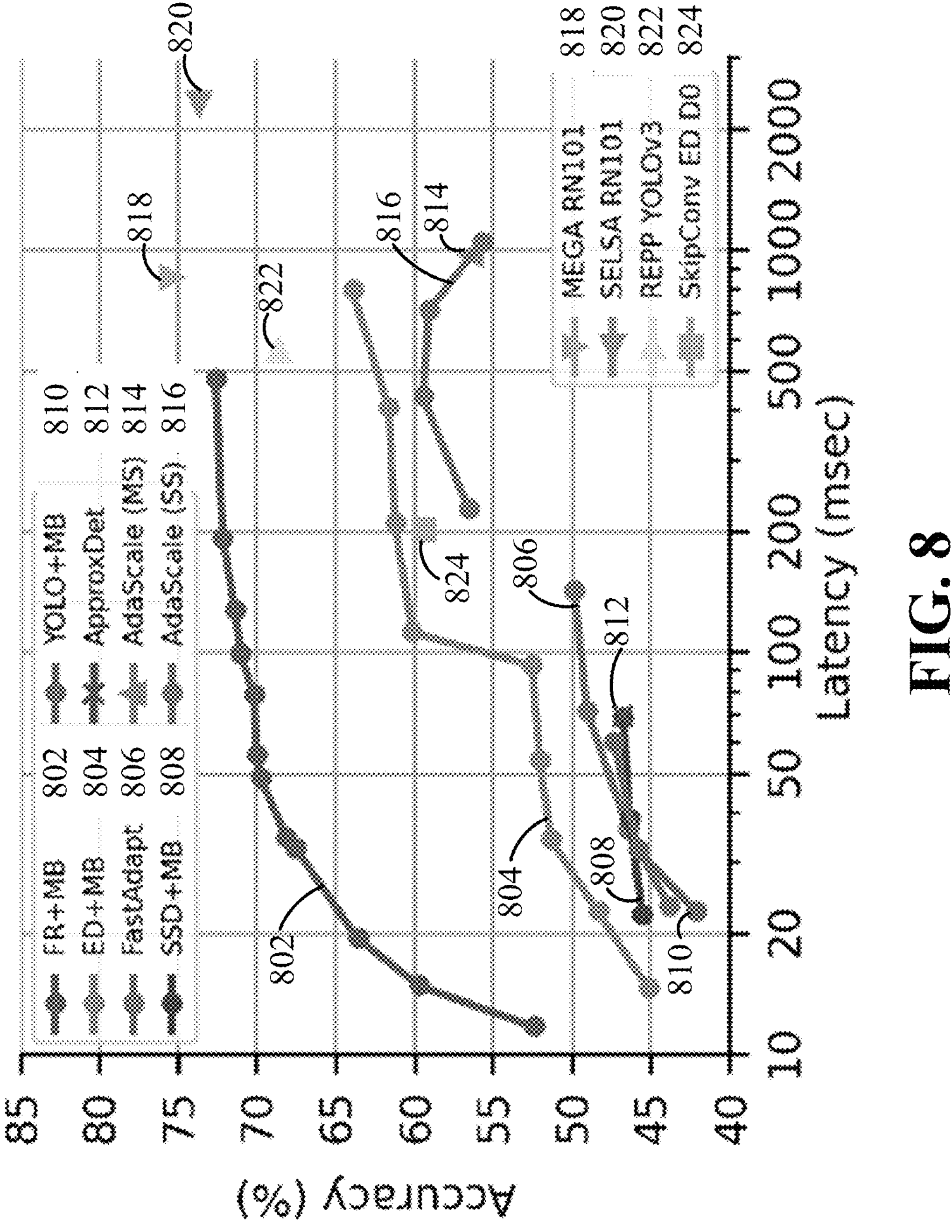
FIG. 8 illustrates accuracy and latency performance of various protocols according to some embodiments.

FIG. 8 shows the accuracy and latency performance of each protocol, in which the latency scale is logarithmic to include a large variety of protocols. In the experiment, the FR+MB protocol 802 leads the accuracy-latency frontiers compared to baselines and other MBODFs. Particularly, FR+MB 802 achieves 67.5% mAP at 30 FPS, 69.7% mAP at 20 FPS, 71.0% mAP at 10 FPS on the TX2. The adaptation range is 40.5× in latency (9.8× within 3% accuracy reduction) and the accuracy is superior to all other protocols given the same latency constraint. On the other hand, ED+MB 804, YL+MB 810, and SSD+MB 808 also enhance the efficiency to achieve the real-time inferencing speed (30 FPS). As for baseline protocols, MEGA 818 and SELSA 820, with their deeper ResNet 101 kernel, they are 2.9% and 1.1% more accurate than the most accurate branch in FR+MB 802 and much slower than FR+MB 802 (running at 1.2 and 0.4 FPS). REPP 822, SkipConv 824, AdaScale 814, FastAdapt 806 and ApproxDet 812 are both worse than FR+MB protocol 802 with lower accuracy and higher latency. To conclude, the example framework 200 on top of four popular object detectors can greatly enhance the efficiency to achieve real-time speed and the best of them, FR+MB 802, leads the accuracy-latency frontier and has comparable accuracy with the accuracy optimized models.

All adaptive and efficient protocols are able to run within 100 ms per frame (10 FPS speed) and examine the accuracy at 50, 30, 20, and 10 FPS in Table 3. The results show that FR+MB+CAS achieves marginally better accuracy results than FR+MB by to 0.8% mAP through its content-aware scheduler. Compared to the FastAdapt baseline, the content-aware scheduler 210 achieves a higher benefit, 0.7% to 2.3% mAP improvement. To summarize, in addition to the illuminating results in FIG. 8, the exploration on the content-aware design boosts the accuracy-latency frontier further.

TABLE 3

Accuracy comparison of SmartAdapt over all efficient baselines given stringent latency constraints on the ILSVRC VID validation dataset. The object detectors FR, ED, SSD, and YOLO cannot meet the 100 ms latency constraint with a MBODF and thus not shown.

| Protocols | 20.0 ms | 33.3 ms | 50 ms | 100 ms |
|---|---|---|---|---|
| FR + MB + Oracle (3,942 br.) | 71.5% | 75.8% | 76.3% | 77.6% |
| FR + MB + Oracle (368 br.) | 67.1% | 72.1% | 72.9% | 74.8% |
| FR + MB + CAS | 64.1% | 68.3% | 69.8% | 71.1% |
| FR + MB | 63.6% | 67.5% | 69.7% | 71.0% |
| FastAdapt + CAS | N/A | 46.1% | 47.1% | 50.3% |
| FastAdapt | N/A | 43.8% | 46.4% | 49.0% |
| ED + MB | 45.1% | 51.3% | 52.0% | 52.5% |
| SSD + MB | N/A | 45.5% | 46.3% | 46.7% |
| YL + MB | N/A | 42.1% | 45.8% | 47.3% |
| ApproxDet | N/A | N/A | N/A | 46.8% |

N/A means that the accuracy is unusably low.

The CAS is further evaluated with different feature extractors. On the snippet-level dataset, Table 4 shows the MSE, SRC, and recall of our full stack of techniques with different off-the-shelf and trainable feature extractors, on top of a 368-branch and a 3,942-branch FR+MB. The results show consistent lower MSE, higher SRC, and recall in the CAS of all feature extractors compared to the content-agnostic baseline.

TABLE 4

Evaluation of our content-aware MBODF on top of Faster R-CNN object detector with different content extractors against the content-agnostic MBODF (baseline) on the snippet-level dataset.

| metrics | MSE | | SRC | | Recall | |
|---|---|---|---|---|---|---|
| features | 368 br. | 3,942 br. | 368 br. | 3,942 br. | 368 br. | 3,942 br. |
| baseline | 0.091 | 0.109 | 0.377 | 0.376 | 0.354 | 0.343 |
| light | 0.083 | 0.109 | 0.385 | 0.385 | 0.368 | 0.347 |
| HoC | 0.083 | 0.109 | 0.387 | 0.385 | 0.369 | 0.348 |
| HOG | 0.084 | 0.103 | 0.386 | 0.384 | 0.347 | 0.348 |
| MobileNet | 0.082 | 0.102 | 0.385 | 0.385 | 0.368 | 0.347 |
| MobileNet Tr. | 0.083 | N/A | 0.385 | N/A | 0.361 | N/A |

N/A means the training cannot finish in a reasonable time.

Figure 9:
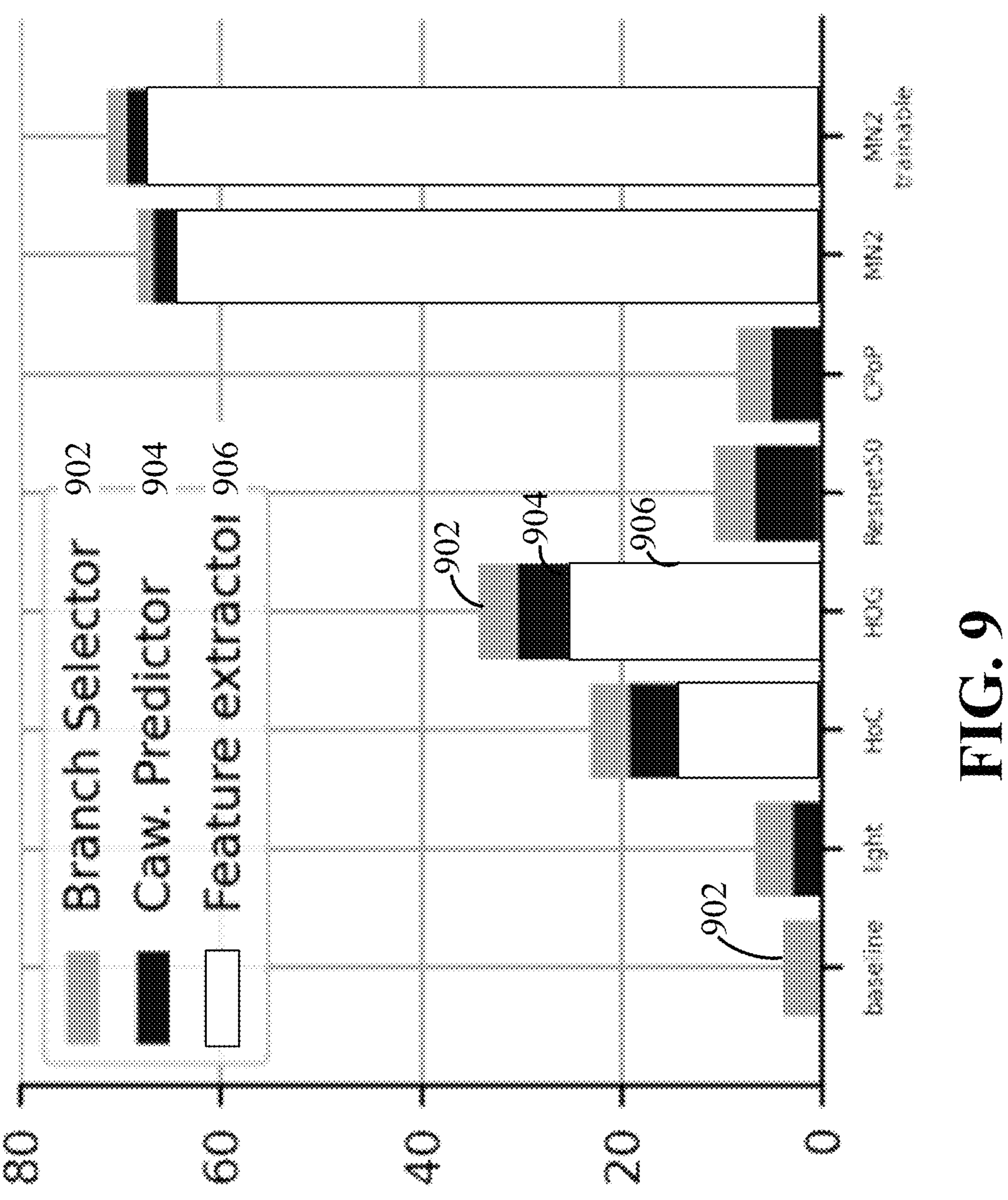
FIG. 9 illustrates latency breakdown of a branch selector, a content-aware predictor, and a feature extractor according to some embodiments.

While the CAS improves accuracy-latency frontier of the MBODF, its latency overhead is further evaluated because a naïve design will result in additional overhead of the scheduler on top of the latency of MBODF. FIG. 9 shows the latency breakdown in the CAS. The cost of light feature is zero, and the cost of ResNet50 and CPoP feature extractors are minor, since ResNet50 and CPoP features come from the object detector itself. The costs of the HoC and HOG features are intermediate, between 20 to 35 ms per run, adding a minor overhead considering its triggering frequency ranges from every 8 to 50 frames. The cost of a MobileNetV2 features, whether trainable or not, is around 65 ms per run.

Figure 10:
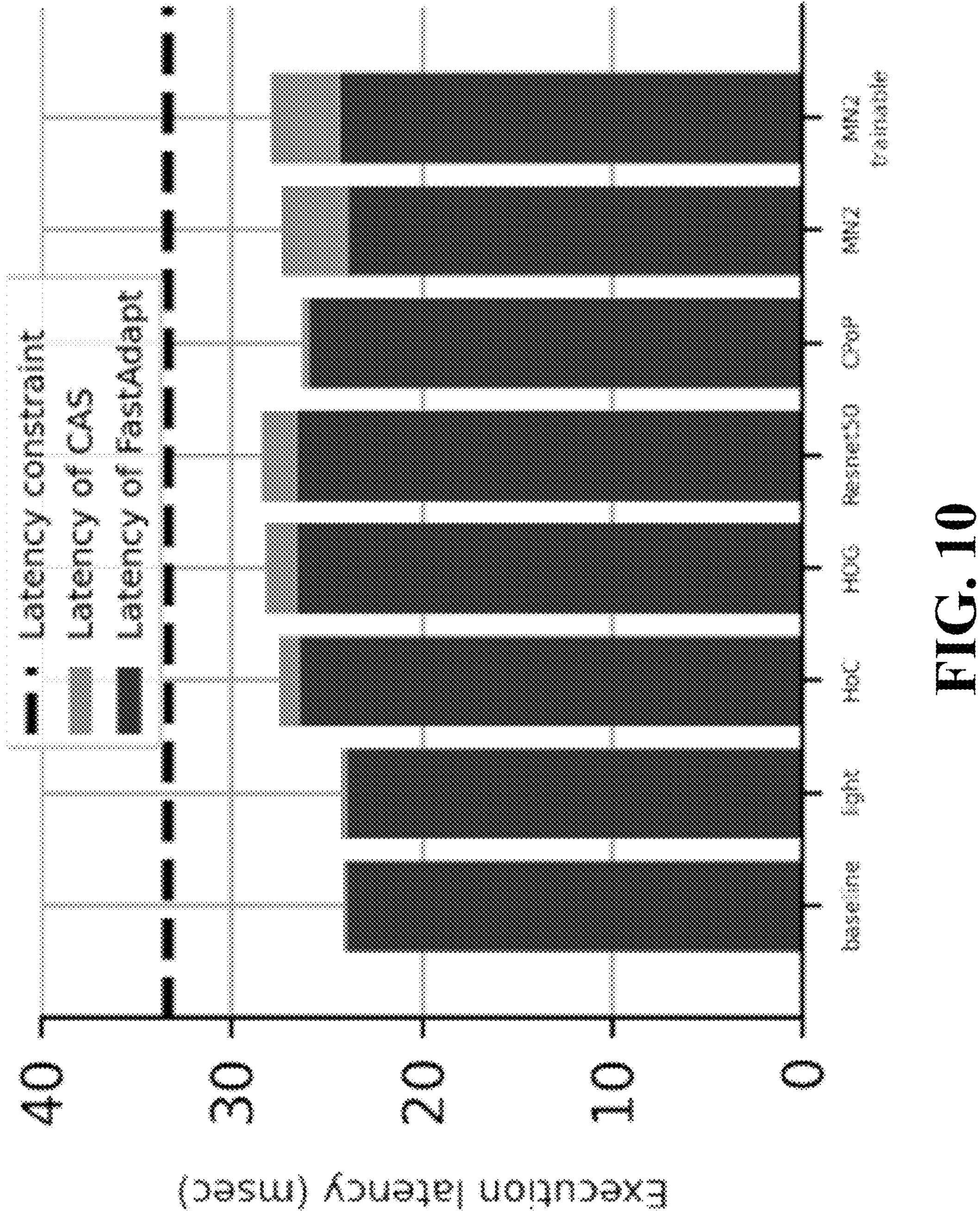
FIG. 10 illustrates an evaluation of FastAdapt and a content-aware scheduler with a latency constraint.

FIG. 10 further illustrates an evaluation of FastAdapt+CAS with a 33.3 ms latency constraint. The latency of the execution kernel is almost the same and summed latency meets the latency budget for all feature extractors (including the most expensive MobileNetV2), owing to a conservative branch selection strategy where the branch selector uses 95th percentile latency as the criteria to choose the branch. Furthermore, we find that the latency cost of MobileNetV2 can be reduced by 20% using a smaller input resolution of 64×64×3, with similar performance—one of many optimizations, which can be leveraged to further reduce the cost.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for computer vision analysis, comprising:

receiving, by an electronic processor, a video frame;

determining, by the electronic processor, an execution configuration among a plurality of configurations at an inference time based on the video frame and a plurality of metrics, the plurality of metrics comprising: a latency metric, an accuracy metric, and an energy metric, wherein the determining of the execution configuration comprises:

extracting, by the electronic processor, a plurality of feature representations from the video frame, predicting, by the electronic processor, a plurality of accuracy indications corresponding to the plurality of configurations based on the plurality of feature representations, the accuracy metric comprising the plurality of accuracy indications, and determining, by the electronic processor, the execution configuration based on the plurality of accuracy indications, the latency metric, and the energy metric; and performing, by the electronic processor, a computer vision analysis task at the inference time based on the video frame and the execution configuration.

2. The method of claim 1, wherein each configuration of the plurality of configurations is defined by a unique set of values for a plurality of tunable knobs, the plurality of tunable knobs comprising: a detector interval, an input resolution of a detector, a number of proposals, an input resolution of a tracker, and a confidence threshold.

3. The method of claim 2, wherein each of the plurality of tunable knobs is an independent dimension on a configuration space.

4. The method of claim 1, wherein the computer vision analysis task comprises object detection, and wherein for the performing of the object detection, the plurality of configurations is determined by a detector knob, the detector knob comprising at least one of: a detector interval, an input resolution, or a number of proposals.

5. The method of claim 1, wherein the computer vision analysis task comprises object tracking, and wherein for the performing of the object tracking, the plurality of configurations is determined by a tracker knob, the tracker knob comprising at least one of an input resolution of a tracker or a confidence threshold.

6. The method of claim 1, wherein the video frame is a first video frame, wherein the performing of the computer vision analysis task comprises performing object detection for the first video frame at the inference time, and wherein the method further comprises:

receiving, by the electronic processor, a second video frame, the second video frame being subsequent to the first video frame; and performing, by the electronic processor, object tracking based on the second frame and based in part on the object detection for the first frame.

7. The method of claim 1, wherein the plurality of feature representations is extracted using a plurality of feature extractors, and wherein a first feature extractor of the plurality of feature extractors comprises a retrainable machine learning model configured to receive the video frame and produce a first feature representation of the plurality of feature representations.

8. The method of claim 1, wherein the predicting of the plurality of accuracy indications comprises:

providing, by the electronic processor, the plurality of feature representations for each of the plurality of configurations to a first machine learning model; and obtaining, by the electronic processor, the plurality of accuracy indications corresponding to the plurality of configurations from the first machine learning model.

9. The method of claim 8, wherein the first machine learning model comprises a feature projection layer to project the plurality of feature representations to a plurality of fixed vectors; and a multi-layer fully connected neural network with a rectified linear unit (ReLU) configured to receive the plurality of fixed vectors from the feature projection layer.

10. The method of claim 1, wherein the determining of the execution configuration further comprises: filtering the plurality of configurations based on the latency metric and the energy metric for a subset of the plurality of configurations meeting the latency metric and the energy metric, wherein the predicting of the plurality of accuracy indications comprises: predicting a subset of the plurality of accuracy indications, the subset of the plurality of accuracy indications corresponding to the subset of the plurality of configurations, and wherein the execution configuration is a highest accuracy indication of the subset of the plurality of accuracy indications.

11. The method of claim 1, further comprising:

embedding, by the electronic processor, the latency metric and the energy metric on separate feature vectors using multi-layer perceptrons, wherein the plurality of feature representations is representations being combined with information from the separate feature vectors.

12. The method of claim 1, wherein the computer vision analysis task comprises object detection, wherein the video frame is a first video frame in a group of frames, and wherein the performing of the computer vision analysis task comprises: performing the object detection for the first video frame in the group of frames based on an object detection machine learning model.

13. The method of claim 12, wherein the energy metric comprises an energy consumption amount indication to process each frame of the group of frames.

14. The method of claim 1, wherein the video frame is received from a video source that is integrated with or directly coupled to a device that includes the electronic processor.

15. A system for computer vision analysis, comprising:

a memory; and an electronic processor coupled with the memory, the processor configured to:

receive a video frame;

determine an execution configuration among a plurality of configurations at an inference time based on the video frame and a plurality of metrics, the plurality of metrics comprising: a latency metric, an accuracy metric, an energy metric, wherein to determine the execution configuration, the electronic processor is configured to:

extract a plurality of feature representations from the video frame, predict a plurality of accuracy indications corresponding to the plurality of configurations based on the plurality of feature representations, the accuracy metric comprising the plurality of accuracy indications, and determine the execution configuration based on the plurality of accuracy indications, the latency metric, and the energy metric; and perform a computer vision analysis task at the inference time based on the video frame and the execution configuration.

16. The system of claim 15, wherein each configuration of the plurality of configurations is defined by a unique set of values for a plurality of tunable knobs, the plurality of tunable knobs comprising: a detector interval, an input resolution of a detector, a number of proposals, an input resolution of a tracker, and a confidence threshold.

17. The system of claim 15, wherein the video frame is a first video frame, wherein the computer vision analysis task comprises object detection, wherein to perform the computer vision analysis task, the processor is configured to perform the object detection for the first video frame at the inference time, and wherein the electronic processor is further configured to:

receive a second video frame, the second video frame being subsequent to the first video frame; and perform object tracking based on the second frame and based in part on the object detection for the first frame.

18. The system of claim 15, wherein to predict the plurality of accuracy indications, the electronic processor is configured to:

provide the plurality of feature representations for each of the plurality of configurations to a first machine learning model; and obtain the plurality of accuracy indications corresponding to the plurality of configurations from the first machine learning model.

19. The system of claim 15, wherein to determine the execution configuration, the electronic processor is further configured to: filter the plurality of configurations based on the latency metric and the energy metric for a subset of the plurality of configurations meeting the latency metric and the energy metric, wherein to predict the plurality of accuracy indications, the electronic processor is configured to: predict a subset of the plurality of accuracy indications, the subset of the plurality of accuracy indications corresponding to the subset of the plurality of configurations, and wherein the execution configuration is a highest accuracy indication of the subset of the plurality of accuracy indications.

20. The system of claim 15, further comprising a video source coupled with the memory and the electronic processor, and configured to output the video frame to the electronic processor.

* * * * *